T. L. STURTEVANT.
SCREEN SEPARATOR.
APPLICATION FILED AUG. 6, 1920.

1,397,340.

Patented Nov. 15, 1921.
3 SHEETS—SHEET 1.

INVENTOR.
Thomas L. Sturtevant
BY
ATTORNEY.

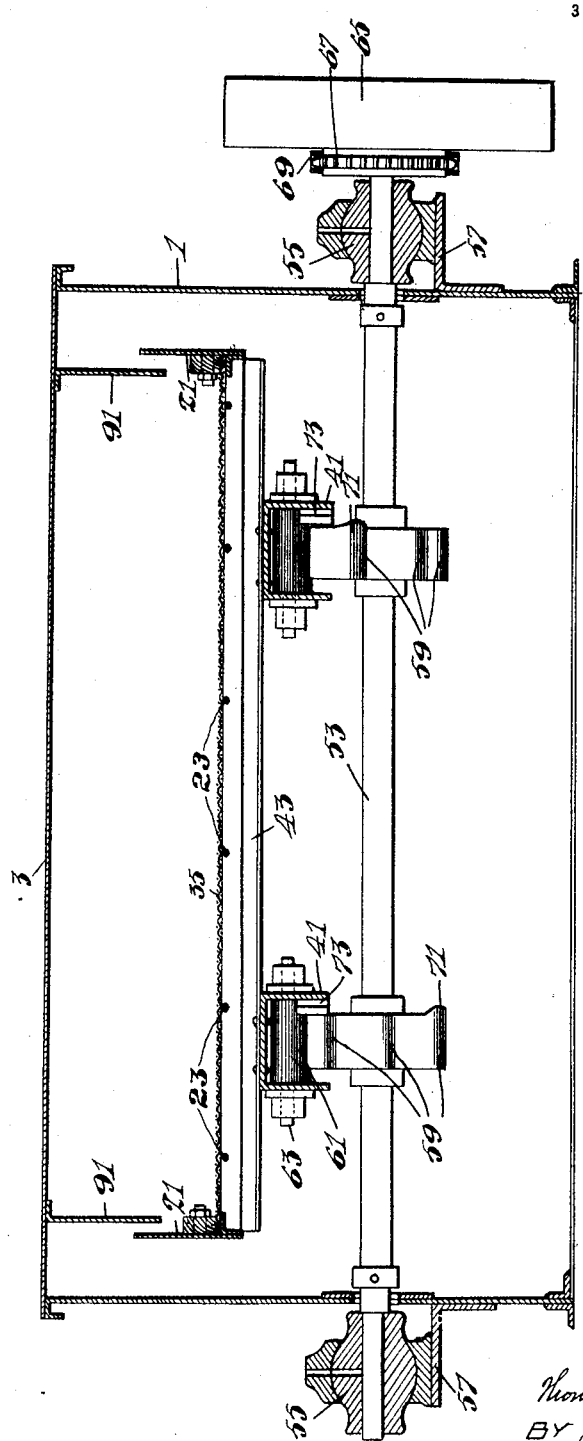

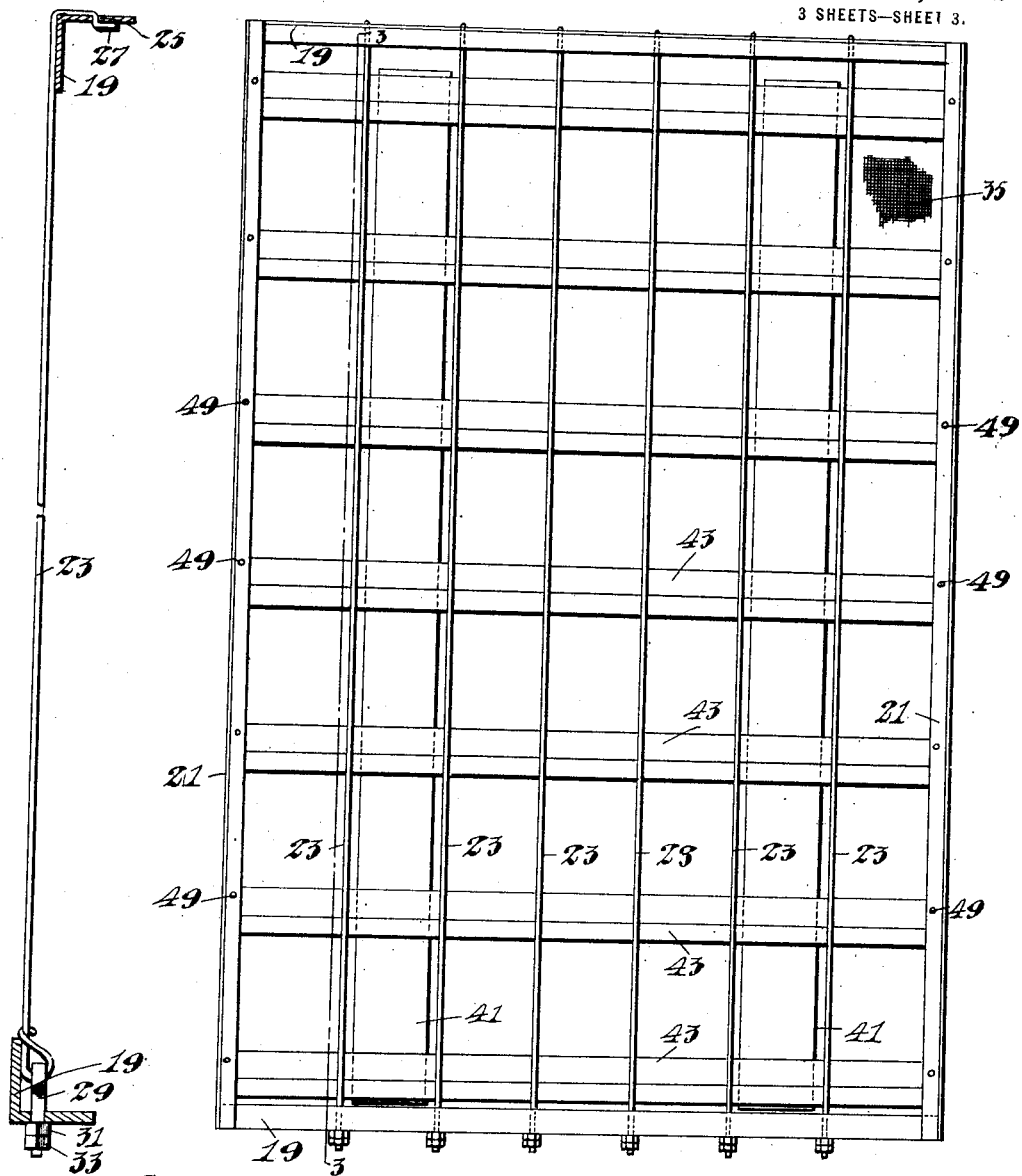

UNITED STATES PATENT OFFICE.

THOMAS L. STURTEVANT, OF QUINCY, MASSACHUSETTS, ASSIGNOR TO STURTEVANT MILL COMPANY, OF BOSTON, MASSACHUSETTS, A CORPORATION OF MASSACHUSETTS.

SCREEN-SEPARATOR.

1,397,340.  Specification of Letters Patent.  Patented Nov. 15, 1921.

Application filed August 6, 1920. Serial No. 401,601.

*To all whom it may concern:*

Be it known that I, THOMAS L. STURTEVANT, a citizen of the United States, residing at Quincy, in the county of Norfolk and State of Massachusetts, have invented an Improvement in Screen-Separators, of which the following description, in connection with the accompanying drawings, is a specification, like characters on the drawings representing like parts.

The invention to be hereinafter described relates to screen separators for grading materials, and more particularly to means for supporting the screen clothing and keeping the meshes of the clothing in open condition for efficient grading effect.

This means, in the present instance of the invention, comprises a series of vibratory members placed beneath the screen clothing, to which a very lively vibration is imparted. These members may be in the form of wires or equivalent members which preferably are so located as to offer minimum obstruction to the materials passing through the screen clothing. Tensioned wires may desirably be employed, and means may be provided for vibrating these wires up and down, laterally and in other directions. The construction is such that the wires or members will slap or thrash against the clothing, the clothing will slap or thrash against the wires, and the materials thrown up by the clothing will come down and slap against the same. These motions will combine to maintain all or nearly all of the meshes of the clothing in open condition for efficient grading effect.

With the aforesaid and other purposes in view, the character of the invention will be best understood by reference to the following description of one good form thereof, shown in the accompanying drawings, wherein:—

Fig. 2 is a transverse section taken on the line 2—2 of Fig. 1;

Fig. 3 is a longitudinal sectional view of the frame which supports the screen clothing;

Fig. 4 is a plan view of the screen frame with the screen clothing removed; and

Fig. 5 is a transverse sectional view through the screen clothing and supporting frame.

Figure 1:
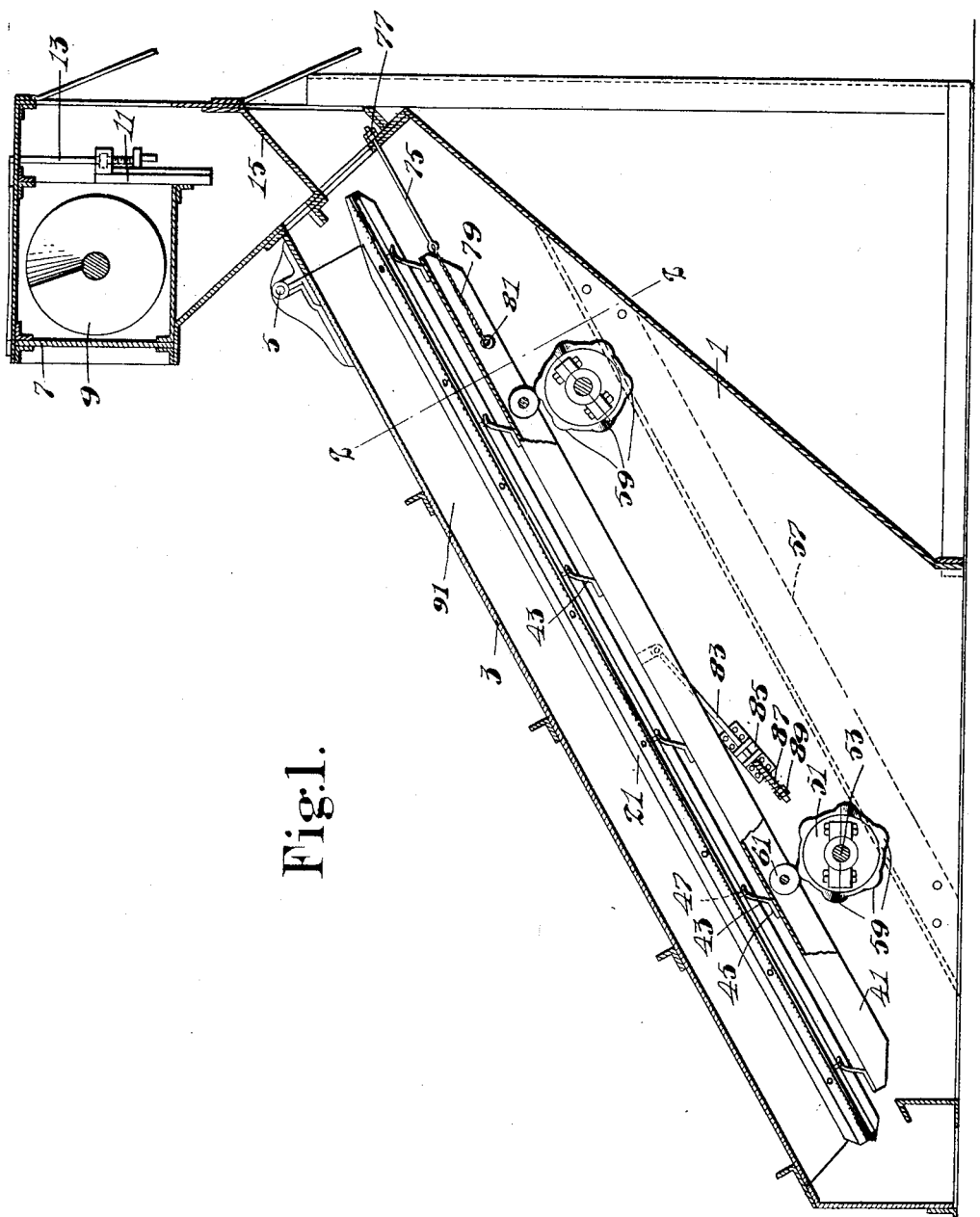
Figure 1 is a vertical longitudinal section through a separator embodying the present invention.

Referring to the drawings, the separator shown therein as one good form of the invention, comprises a casing 1 having a cover 3 connected by hinges 5 with the casing adjacent the upper end thereof. Mounted on the top of the casing is a feed box 7 containing a screw conveyer 9 for feeding the materials along the feed box and over a feed board 11 suspended by hangers 13 which may be adjusted to vary the elevation of the feed board as required. Beneath the feed box is an inclined spill board 15 for directing the materials flowing over the feed board into the upper end of the casing 1.

The supporting means for the screen, in the present instance of the invention, comprises a frame (Fig. 4) having side angle bars 17 connected to end angle bars 19. Side plates 21 have flanges riveted or otherwise secured to the side angle bars 17 of the frame.

A series of vibratory members may be connected to said frame, said members, in the present instance, being in the form of wires 23. In the present instance, the upper ends of the wires are carried over the top flange of the upper end angle bar 19, and bent around said end and entered through holes 25. The wires are bent thence backward to present anchorages 27 engaging the inner face of the depending flange of the end angle bar, the construction being such that the upper ends of the wires are securely anchored to the upper end angle bar. Suitable means may be provided at the lower end of the wires to tension the same. This means, in the present instance of the invention, comprises eye-bolts 29 entered through the depending flange of the lower end angle bar, the lower ends of the wires being entered through the eyes of said bolts and suitably tied thereto. The eye-bolts may have adjusting nuts 31 whereby the wires may be placed at the tension desired, and then secured by lock nuts 33. The tension of these wires may vary according to conditions as desired, but under certain conditions it is found that a tension of 300 lbs. is satisfactory. In some instances eye-bolts may be provided to anchor both the upper and lower ends of the wires to the upper and lower end bars if desired.

Screens of varying character may be mounted on the support afforded by the frame and the tension wires. In the present instance of the invention, a screen is provided comprising screen clothing 35 of woven wire having any suitable mesh desired according to the character of the classification required. In the present form of the invention, the side margins of the clothing are tacked or otherwise secured to side members or bars 37 of wood or other suitable material but the end margins are free. These bars mays be detachably connected to the side plates 21 referred to, by bolts 39. The adjustment of the side members preferably is such that the wires of the clothing are not stretched, and the meshes are not enlarged, but the clothing rests on the tension wires and is supported thereby without distortion of the clothing or loss of the original meshes thereof.

Having described the screen and the frame with tensioned supporting wires thereon, next will be described means for supporting said frame. This means, in the present instance of the invention, comprises longitudinal members or channels 41 preferably extending the length of the screen supporting frame, and preferably located somewhat in from the side angle bars 17 of said frame. Mounted on these channels are transverse members 43 having edge portions 45 secured to the backs of the channels, and free portions projecting upward in an inclined direction from the secured edges and presenting curved margins 47. These transverse members may project laterally beyond the channels, and the ends thereof may be secured by bolts 49 to the side angle bars and plates of the screen supporting frame.

The channels and transverse members may have a flexible resilient character such that the channels may flex or vibrate in the direction of the length thereof, and the transverse members may flex or vibrate in the direction of the length thereof, and also the curved margins thereof may vibrate toward and from the backs of the channels. Therefore, the channels and transverse members constitute a supporting frame of a highly resilient character susceptible of pronounced and complex vibratory movements for efficiently vibrating the screen supporting frame, the tension wires, and the screen clothing mounted thereon, as more fully hereinafter described.

Any suitable means may be provided for vibrating these frames. To accomplish this, in the present instance, cams 51 may be provided, each preferably made in two parts to enable them to be clamped on shafts 53 extending across the casing 1 and having end portions journaled in bearings 55 which may be suitably supported. In the present instance, these bearings are mounted on angle bars 57 located externally of the sides of the casing, and having their end portions secured to said casing. The construction is such that the side angle bars being unsecured intermediate their end portions are susceptible of more or less vibratory movement.

Each of the cams may have humps or projections 59 on the peripheries thereof, the number of which may be varied as desired. Coöperating with these peripheral humps or projections are followers conveniently in the form of rollers 61 mounted on shafts 63 carried by the depending flanges of the channels 41.

The lower shaft 53 may have a pulley 65 fast on one end thereof, and the shafts may be provided with sprocket wheels 67 connected by sprocket chains 69.

The construction is such that on rotation of the shafts and cams, the humps on the peripheries of the latter will progressively engage and thump the rollers, which in turn will transmit vibratory movements to the longitudinal channels, the transverse members thereon, and the screen supporting frame, the tensioned wires, and the clothing supported thereby. Preferably the cams are so mounted on their shafts that they are rotated out of step, and therefore, the screen support will be rocked laterally and longitudinally with complex movements caused by the out-of-step thumpings of the cams. This will cause the longitudinal channels to undulate or vibrate longitudinally, and cause the transverse members on the channels to undulate or vibrate longitudinally and transversely. These complex vibrations of the channels and transverse members are in turn transmitted to the screen supporting frame and the tensioned wires.

The screen clothing and the wires will slap or flap against each other throughout the lengths of the tensioned wires, and owing to the complex character of the vibrations set up in the wires and the clothing, they will slap against each other with a variety of movements which will insure that the meshes of the clothing will be maintained in open condition for efficient grading effect. As stated, preferably the clothing is not stretched, but merely rests upon and is supported by the tensioned wires. As a consequence, the clothing and wires may slap against each other with a desired amplitude of movement and they will come together with substantial force.

Preferably the wires extend longitudinally of the frame, although in some instances they might extend transversely of the frame or in any direction desired. However, it is found in practice that it is desirable to have the wires extend longitudinally of the frame for the reason that they offer a minimum obstruction to materials passing through the screen clothing.

Any fibrous or stringy materials, such, for example, as roots or cotton fibers falling upon the rapidly vibrated tensioned wires which thrash against the clothing, will either be shaken off of the wires or slide downward along them, since there are no cross wires to check their fall therefrom.

In some instances it may be desirable not only to provide the cams with peripheral projections, but also to provide them with lateral projections, or equivalent means for imparting lateral shaking movements to the frames, stretched wires and screens. In the present instance, the cams are provided with lateral nubs or projections 71 adapted to engage followers, in the present instance, in the form of wedges 73 carried by depending flanges of the channels. The construction is such that on rotation of the lateral nubs, they will engage and thump against the wedge followers 73 and impart lateral shaking movements to the channels, transverse members, screen frame, stretched wires, and the clothing mounted thereon.

The cams may be so located as to support the screen in inclined position, in order that the materials delivered by the spill board referred to, may flow downward along the screen. Suitable means may be provided for preventing the screen from sliding downward off from the cams. This means, in the present instance, comprises hanger rods 75 having their upper ends entered through holes in the upper end of the casing, and provided with adjusting and securing nuts 77. At the lower ends of the hanger rods are chains 79 connected to bolts 81 attached to the channels adjacent the upper ends thereof.

The tendency of the cams in the course of their rotation is to thrust the support of the screen upwardly if the cams are rotated in a clockwise direction (Fig. 1). Suitable means may be provided yieldingly to oppose such movement. This means, in the present instance, comprises rods 83 having their upper ends attached to one of the transverse members 43. Portions of these hanger rods are extended through brackets 85, and coil springs 87 are mounted on said rods and confined between said brackets and nuts 89 on said rods. The construction is such that the springs will react against the brackets and operate through the rods yieldingly to draw the frame downward until limited by the hangers and chains referred to.

The cover may have curtains or plates 91 secured thereto and depending therefrom so as to coöperate with the side plates 21 referred to, and prevent escape of materials over the side edges of the screen.

In operation, the materials to be graded will be introduced into the feed box at one end thereof, and will be moved by the feed screw along said box and caused to flow over the feed board. They will then strike the spill board and be deflected thereby down to the upper surface of the inclined screen. The coarser materials or tailings will flow along the upper surface of the screen and be discharged through one outlet, while the finer materials will pass through the meshes of the clothing and be discharged through another outlet.

The cams preferably are rotated so that the projections or nubs thereon will strike the followers carried by the channels, out of step, and will impart pronounced shaking movements to the supporting frame and to the table comprising the frame carrying the tensioned wires. Since this table is not connected to the casing or frame for the separator, it is free to receive rocking movements and other movements bodily, and in addition to vibrations or tremors of varied character. This will cause the tensioned wires to slap or vibrate up and down, laterally and in other directions with desired amplitude of movement, and thus the wires will vigorously slap against the clothing, which preferably rests upon the wires in unstretched condition. The clothing will slap up and down against the wires, and the materials on the upper surface of the clothing will be thrown upward thereby and come down against the clothing, and further contribute to the vibration thereof. The wires or equivalent members will also slap against the transverse members beneath them, and the frame on which the wires are stretched will also receive a pronounced vibratory movement further contributing to the efficient vibration of the support for the screen clothing. As a consequence, the clothing will be so vibrated or jounced as to keep the meshes thereof in open condition for efficient grading effect.

The table comprising the frame and tensioned wires offers practically no obstruction to the materials passing through the clothing. Also, the frame comprising the channels and the transverse members thereon offer practically no obstruction to the materials passing through the clothing, since the transverse members are inclined or bent so that any materials striking the same will be deflected downward thereby, and said members are not connected to the tensioned wires. The channels are located a substantial distance beneath the wires, and any materials falling on these channels owing to their inclination, will readily flow off from the same. The backs and depending flanges of the channels desirably protect the cams and their followers from the materials flowing downward past the channels.

While the screen shown herein for purposes of illustration is in the form of woven wire clothing, it will be understood that the term "screen" in the claims is to be regarded as sufficiently comprehensive to cover other forms of separating surfaces.

It will be understood that the invention is not limited to the specific embodiment shown, and that various deviations may be made therefrom without departing from the spirit and scope of the appended claims.

What is claimed is:—

1. A separator for grading materials, comprising, in combination, a pair of shafts, cams mounted on said shafts having peripheral projections, a frame resting on and supported by said cams, screen clothing having opposed margins connected to said frame and free end margins, and a series of vibratory members extending along the clothing and having ends secured to said frame, said cams being adapted to jounce the frame up and down bodily and cause the clothing and vibratory members to slap vigorously up and down against each other with a pronounced amplitude of movement.

2. A separator for grading materials, comprising, in combination, rotary supporting cams having peripheral projections thereon, a frame resting on and supported by said cams, screen clothing secured to said frame in unstretched condition, and a series of vibratory members extending along beneath the clothing and having their opposite ends secured to opposite ends of said frame, said cams being adapted to jounce the frame up and down and cause the screen clothing and vibratory members to slap against each other with substantial amplitude of movement.

3. A separator for grading materials, comprising, in combination, rotary cams having projections thereon, a frame resting on said cams and comprising longitudinal and transverse resilient members, screen clothing mounted on and secured to said frame, and a series of vibratory members extending between the clothing and frame and having ends secured to opposite ends of the frame, said cams being adapted to bodily jounce the frame and set up complex vibratory movements of the longitudinal and transverse members of said frame, causing the clothing and vibratory members to slap vigorously against each other with substantial amplitude of movement.

4. A separator for grading materials, comprising, in combination, rotary cams having projections thereon, means for rotating the cams out of step with each other a frame resting on and supported by said cams, screen clothing mounted on said frame, means to connect opposed margins of the clothing detachably to said frame, and a series of vibratory members extending along the clothing and having their ends secured to said frame, said cams being adapted to bodily jounce the frame and cause the clothing and vibratory members to slap vigorously against each other with substantial amplitude of movement.

5. A separator for grading materials, comprising, in combination, a frame, rotary cams on which the frame rests, screen clothing having opposed side margins secured to said frame and free end margins, a series of wires extending along the clothing beneath the same and having their ends secured to said frame, and means for rotating the cams to bodily jounce said frame and cause the clothing and wires or equivalent members to slap vigorously against each other with substantial amplitude of movement.

6. A separator for grading materials, comprising, in combination, a screen supporting frame provided with transversely extending members arranged at spaced intervals, a series of vibratory rods extending lengthwise of the frame above and in position to strike against the transverse members and secured to the ends of the frame, screen clothing resting upon said rods and having opposed margins secured to said frame, and means to jounce the frame up and down and cause the screen clothing and vibratory rods to slap against each other with substantial amplitude of movement.

7. A separator for grading materials, comprising in combination, a flexible frame including spaced longitudinally extending bars having transverse bars secured to the longitudinal bars with the ends of the transverse bars extending substantial distances beyond their points of connection to the longitudinal bars, screen clothing having opposed side margins secured to said frame, a series of vibratory members extending along the clothing and having ends secured to said frame, and means bodily to jounce said frame to vibrate it and cause the clothing and vibratory members to slap vigorously against each other with substantial amplitude of movement.

8. A separator for grading materials, comprising, in combination, a screen supporting frame provided with members arranged at spaced intervals, a series of vibratory wires which extend at substantially an angle to the said members and which are secured to the frame, screen clothing extending in a plane adjacent the plane of the vibratory wires, and means to jounce the frame up and down and transmit to the screen clothing and vibratory wires vibratory movements of substantial amplitude and cause the screen and wires to slap against each other.

In testimony whereof, I have signed my name to this specification.

THOMAS L. STURTEVANT.